(No Model.) 3 Sheets—Sheet 1.

H. L. DIXON.
GLASS FURNACE.

No. 324,307. Patented Aug. 11, 1885.

Witnesses.
Inventor.
Henry L. Dixon
by his attys
Bakewell & Kerr (No Model.) 3 Sheets—Sheet 2.

H. L. DIXON.
GLASS FURNACE.

No. 324,307. Patented Aug. 11, 1885.

Witnesses.
W. B. Corwin
N. L. Gill

Inventor.
Henry L. Dixon
by his attys
Bakewell & Kerr (No Model.) 3 Sheets—Sheet 3.
H. L. DIXON.
GLASS FURNACE.
No. 324,307. Patented Aug. 11, 1885.
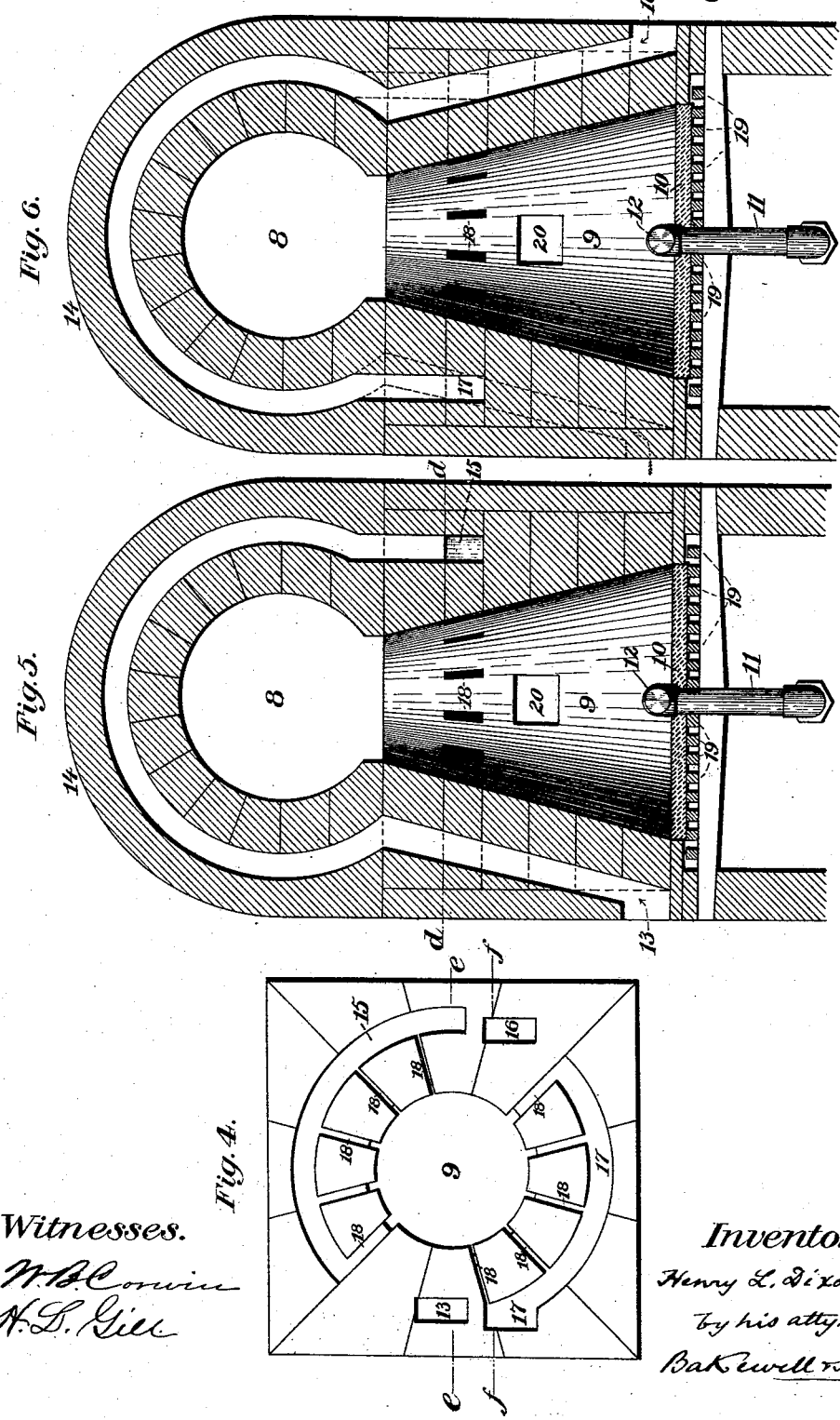
Witnesses.
W. B. Corwin
H. L. Gill
Inventor.
Henry L. Dixon
by his attys
Bakewell & Kerr

UNITED STATES PATENT OFFICE.

HENRY L. DIXON, OF PITTSBURG, PENNSYLVANIA.

GLASS-FURNACE.

SPECIFICATION forming part of Letters Patent No. 324,307, dated August 11, 1885.

Application filed April 16, 1885. (No model.)

*To all whom it may concern:*

Be it known that I, HENRY L. DIXON, of Pittsburg, in the county of Allegheny and State of Pennsylvania, have invented a new and useful Improvement in Glass-Furnaces; and I do hereby declare the following to be a full, clear, and exact description thereof, reference being had to the accompanying drawings, forming a part of this specification, in which—

Figure 1:
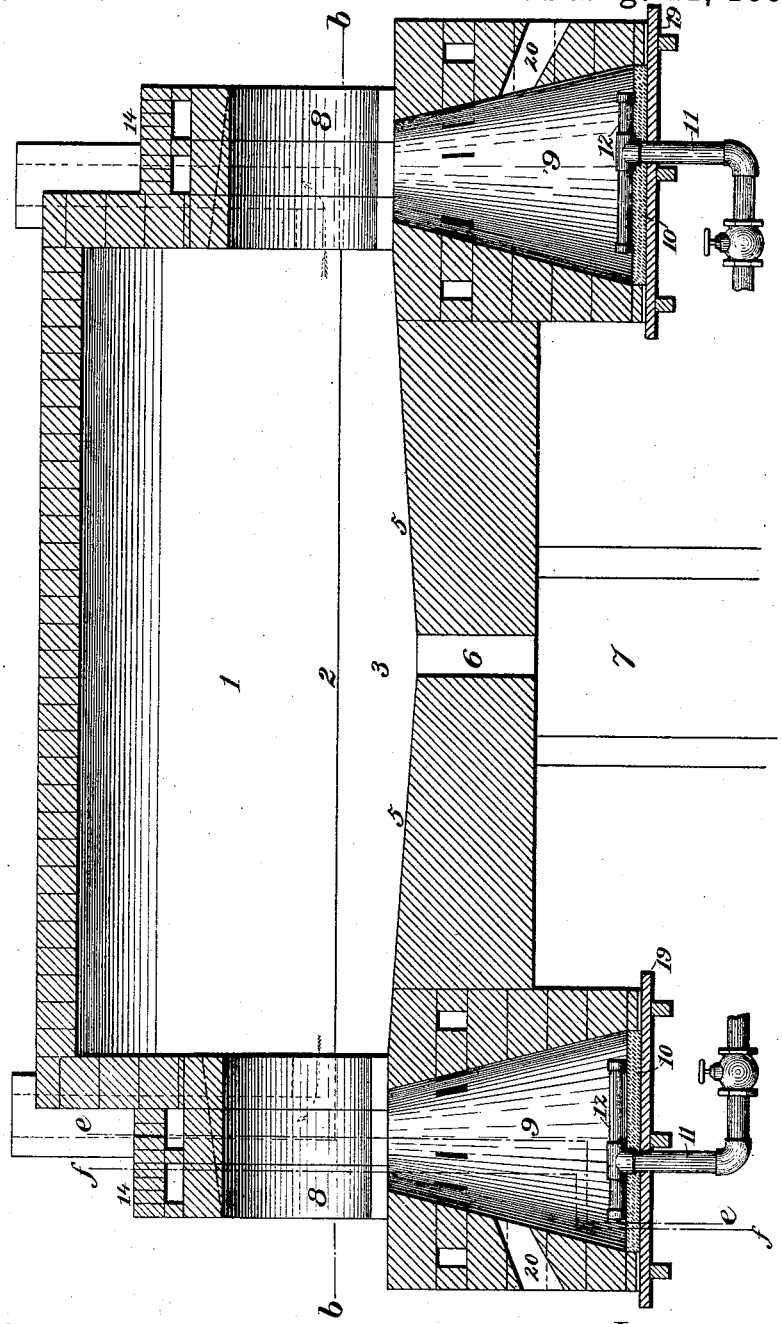
Figure 5:
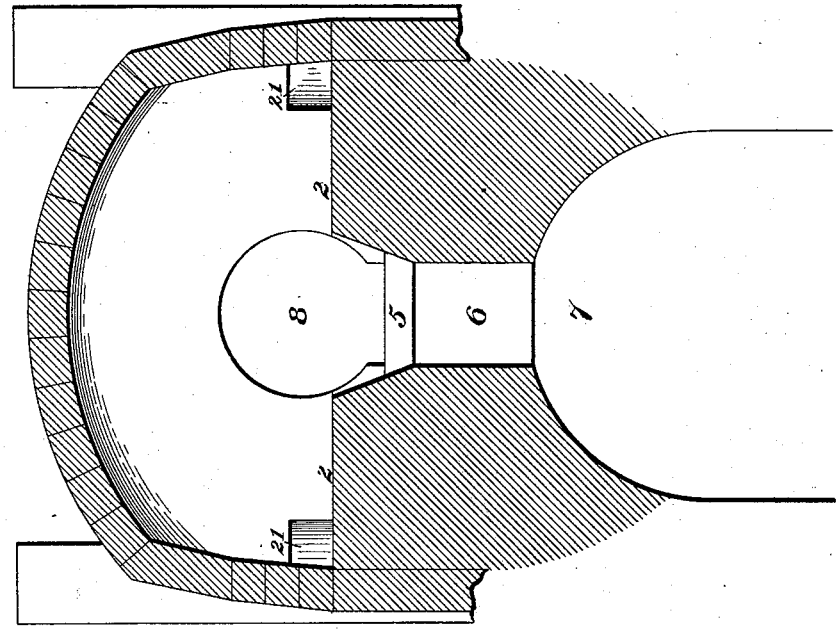
Figure 2:
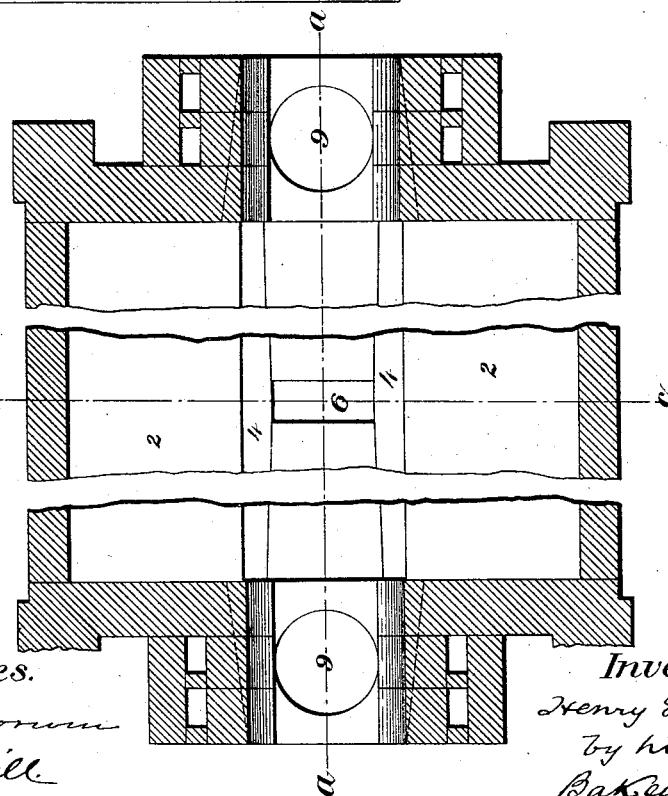

Figure 1 is a longitudinal vertical section of my improved glass-melting furnace on the line $a\,a$ of Fig. 2. Fig. 2 is a horizontal section on the line $b\,b$, Fig. 1. Fig. 3 is a vertical cross-section on the line $c\,c$ of Fig. 2. Fig. 4 is a horizontal section on the line $d\,d$ of Fig. 5. Fig. 5 is a vertical cross-section on the lines $e\,e$ of Figs. 1 and 4. Fig. 6 is a similar view on the lines $f\,f$ of Figs. 1 and 4.

Like figures of reference indicate like parts.

My improved furnace as illustrated is adapted for use with natural gas. It has a melting-chamber, 1, with a bench, 2, along each side for holding the glass-pots, and between the said benches is a longitudinal central sink, 3, with inclined sides 4 extending down from the benches 2, a bottom, 5, inclining from the ends toward a middle or central opening, 6, which leads down into the gallery 7 below the bed. At the ends of the chamber 1 are arched openings or entrances 8, below which are the combustion-chambers 9, the heat and flame from which ascend through the openings 8 into the bed. The lower ends of the combustion-chambers 9 are closed by plates 10, through which the gas-pipes 11 pass, said pipes being fitted with a T or burner pipe, 12.

It will be noticed that the combustion-chamber 9 is conical in form, or of the shape of a frustum of a cone, and opens into the arched or circular chamber 8, which chamber has a greater diameter than the opening leading from the chamber 9, and a less diameter or space in cross-section than the melting-chamber 1, the purpose of which is to allow of the expansion and combustion of the gas in the chamber 8, and at the same time direct the heat and flames into the melting-chamber without retarding the same and without the loss of heat-giving power. Entering the wall at one side of the combustion-chamber 9 is an air-flue, 13, which passes up along the side of the fire-chamber, through the arch 14 and down at the other side, where it communicates with a horizontal semicircular flue, 15. On the opposite side of each combustion-chamber 9 is another flue, 16, which follows the same course as the flue 13, up through the side of the combustion-chamber and over the arch 14, but in an opposite direction, and terminates in a semicircular horizontal flue, 17. Extending radially from the horizontal flues 15 and 17, into the eye or combustion-chamber 9 at each end of the furnace, are series of radial flues 18, the said flues 18 increasing in size as they are greater distances from the point at which the flues 13 and 16 enter the flues 15 and 17. The reason for this is, that the draft of the air from the flues 13 and 16 is greater at the point where it first enters the flues 15 and 17, and diminishes as it passes along said flues 15 and 17, so that in order to equalize the discharge of air into the combustion-chambers 9 from the flues 15 and 17 at all points around the combustion-chamber it is necessary thus to vary the size of the flues 18 relatively to the force of the draft at the points at which they occur. The purpose of the flues 13, 15, 16, 17, and 18 is to make use of the conducted heat of the walls of the furnace for the purpose of heating the air which is supplied to support combustion. When natural gas is used, all the air enters through these flues; but when the furnace is designed to be used with coal or other solid fuel the plates or bottoms 10, which are composed of tiles, are withdrawn, and the grate-bars 19 (shown in Figs. 5 and 6) are utilized. The amount of air admitted through the grate-bars in the latter case is such as is sufficient to properly volatilize the gaseous elements of the fuel, which, rising in the combustion-chambers 9, are thoroughly consumed by mingling with the inflowing air through the flues 18. When solid fuel is used, the combustion-chambers 9 are supplied through the fuel-openings 20. By this construction a perfect combustion of the fuel takes place in the upper ends of the combustion-chambers and in the crown-chambers 8, so that the heat is properly and fully developed at or before entering the melting-chamber 1. The products of combustion and waste heat pass off through the stack-flues 21 in the usual manner. The sink 3 is designed to receive any molten glass which may escape from the pots either from breakage or otherwise, and the inclined floor 5 causes it to fall down to the opening 6, through which it passes, so that it may be caught in a suitable receptacle placed in the cave 7 under the same.

It is desirable to leave a narrow space at the edges of the tiles or plates 10 to create a slight upward draft from below the gas-burner to aid in carrying the gas up through the combustion-chamber. I prefer to make the under side of the arches 14 inclined, as indicated by the broken lines in Fig. 1, for the purpose of throwing the heated products of combustion more perfectly and easily into the melting-chamber, as it gives a reverberatory character to the chamber 8 and prevents the arches from burning out so rapidly. If desired, one of the flues 13 or 16 and its connecting-flue 15 or 17 may be omitted at each end, and the remaining horizontal distributing-flue (15 or 17) be extended around both sides of the combustion-chamber 9 from one or both sides of the remaining adit-flue, (13 or 16.) The pots are put in and removed from the melting-chambers through the arch-openings 8, the outer ends of which are closed when the furnace is in operation.

The furnace is adapted to be used with open pots with an inferior grade of fuel, the combustion being thoroughly effected in the eye of the combustion-chamber and in the arch-openings 8, so that the unconsumed gases do not have an opportunity to come in contact with the glass. This arrangement also causes the more uniform heating of the melting-chamber and largely obviates the formation of cutting currents, thereby saving the pots from rapid deterioration and wear and producing a more uniform operation of the furnace.

I do not desire to claim, broadly, an arched combustion-chamber situate at the end of a glass-melting furnace, nor air-flues arranged within the walls of the same, as I am aware that these features are in themselves not new.

What I claim as my invention, and desire to secure by Letters Patent, is—

1. In a glass-furnace, the combination of the combustion-chamber 9, having a contracted opening leading into the arched chamber 8, the arched chamber 8, situate directly above the combustion-chamber at the end of the furnace, said chamber 8 having a greater diameter or area in cross-section than the opening from the chamber 9, and a less diameter or area in cross-section than the melting-chamber of the furnace, and opening directly into the melting-chamber at the end thereof, substantially as and for the purposes specified.

2. In a glass-furnace, the combination of the conical combustion-chamber 9, the arched chamber 8, situate directly above the chamber 9 and at the end of the furnace, said chamber 8 being substantially circular in cross-section and of a greater diameter than the opening from the combustion-chamber 9, and a melting-chamber situate next adjacent to the chamber 8 and greater in cross-sectional area than the said chamber, substantially as and for the purposes specified.

3. In a glass-furnace, the combination of the chamber 9, the circular chamber 8, situate at the end of the furnace above the level of the floor of the melting-chamber, with an air-flue entering the wall at the side of the combustion chamber, extending up over the crown and opening into a horizontal flue, which extends around the combustion-chamber, and is provided with lateral flues leading into the combustion-chamber, substantially as and for the purposes described.

4. In a glass-furnace, the combination of the chamber 9, the circular chamber 8, situate at the end of the furnace above the level of the floor of the melting-chamber, with air-flues entering the wall at the opposite sides of the combustion-chamber, extending up over the crown and opening into the horizontal flues which extend around the opposite sides of the combustion-chamber, and are provided with lateral flues leading into the latter, substantially as and for the purposes described.

5. In a glass-furnace, the combination of the chamber 9, the circular chamber 8, situate at the end of the furnace above the level of the floor of the melting-chamber, with an air-flue entering the wall at the side of the combustion-chamber and opening into a flue which extends around the combustion-chamber, and is provided with lateral flues leading into the latter, said latter flues increasing in size as they occur at greater distances from the point at which the air-flue enters the horizontal flue, substantially as and for the purposes described.

In testimony whereof I have hereunto set my hand this 9th day of April, A. D. 1885.

HENRY L. DIXON.

Witnesses:
W. B. CORWIN,
J. K. SMITH.